US010860870B2

(12) United States Patent
Noda et al.

(10) Patent No.: US 10,860,870 B2
(45) Date of Patent: Dec. 8, 2020

(54) OBJECT DETECTING APPARATUS, OBJECT DETECTING METHOD, AND COMPUTER PROGRAM PRODUCT

(71) Applicants: Kabushiki Kaisha Toshiba, Minato-ku (JP); Toshiba Electronic Devices & Storage Corporation, Minato-ku (JP)

(72) Inventors: Reiko Noda, Kawasaki (JP); Tomoki Watanabe, Inagi (JP)

(73) Assignees: Kabushiki Kaisha Toshiba, Minato-ku (JP); Toshiba Electronic Devices & Storage Corporation, Minato-ku (JP)

( * ) Notice: Subject to any disclaimer, the term of this patent is extended or adjusted under 35 U.S.C. 154(b) by 64 days.

(21) Appl. No.: 15/911,377

(22) Filed: Mar. 5, 2018

(65) Prior Publication Data
US 2019/0205668 A1  Jul. 4, 2019

(30) Foreign Application Priority Data
Nov. 22, 2017  (JP) ................. 2017-225091

(51) Int. Cl.
*G06K 9/00* (2006.01)
*G06T 7/44* (2017.01)
*G06T 7/73* (2017.01)
*G05D 1/02* (2020.01)
(Continued)

(52) U.S. Cl.
CPC ......... *G06K 9/00805* (2013.01); *B60W 30/08* (2013.01); *G05D 1/0238* (2013.01);
(Continued)

(58) Field of Classification Search
CPC ........... G06T 7/44; G06T 7/73; G05D 1/0238; G05D 1/0246; G06K 9/00208; G06K 9/00798; G06K 9/00825
See application file for complete search history.

(56) References Cited

U.S. PATENT DOCUMENTS

| | | | |
|---|---|---|---|
| 2007/0205881 A1* | 9/2007 | Breed | B60C 23/0433 340/447 |
| 2013/0182908 A1* | 7/2013 | Nishimura | G06T 7/62 382/104 |

(Continued)

FOREIGN PATENT DOCUMENTS

| | | |
|---|---|---|
| JP | 2004-126947 | 4/2004 |
| JP | 5899944 | 4/2016 |
| JP | 2019-8460 A | 1/2019 |

OTHER PUBLICATIONS

Arsalan Mousavian et al. "3D Bounding Box Estimation Using Deep Learning and Geometry", arXiv:1612.00496[cs.CV], Apr. 10, 2017, 10 pages.

(Continued)

*Primary Examiner* — Santiago Garcia
(74) *Attorney, Agent, or Firm* — Oblon, McClelland, Maier & Neustadt, L.L.P.

(57) ABSTRACT

According to an embodiment, an object detecting apparatus includes a detector and an estimation processing unit. The detector is configured to detect an object candidate area from a captured image. The estimating processing unit is configured to, by performing estimation processing using a part of or a whole of the captured image including at least the object candidate area, output object information including at least information representing a pose of an object in the object candidate area. The estimation processing includes: a first process estimating, from among vertices of a cuboid circumscribing the object and making contact with a road surface, positions of at least two vertices on the captured image that are viewable from a viewpoint of the captured image; and a second process estimating to which one of right-front, left-front, right-rear, or left-rear of the object the vertices having positions estimated by the first process are respectively corresponding.

14 Claims, 9 Drawing Sheets

(51) Int. Cl.
 *G08G 1/16* (2006.01)
 *B60W 30/08* (2012.01)

(52) U.S. Cl.
 CPC ....... *G05D 1/0246* (2013.01); *G06K 9/00208* (2013.01); *G06K 9/00798* (2013.01); *G06K 9/00825* (2013.01); *G06T 7/44* (2017.01); *G06T 7/73* (2017.01); *G08G 1/165* (2013.01); *G08G 1/166* (2013.01); *G05D 2201/0213* (2013.01); *G06K 2209/23* (2013.01); *G06T 2207/20084* (2013.01); *G06T 2207/30261* (2013.01)

(56) References Cited

U.S. PATENT DOCUMENTS

| | | | | |
|---|---|---|---|---|
| 2014/0320640 | A1* | 10/2014 | Barbier | G02B 27/0093 348/135 |
| 2017/0304732 | A1* | 10/2017 | Velic | G06K 9/6202 |
| 2018/0144496 | A1* | 5/2018 | Posner | G06T 7/73 |
| 2018/0173237 | A1* | 6/2018 | Reiley | G05D 1/0061 |
| 2018/0373942 | A1 | 12/2018 | Noda et al. | |
| 2019/0095720 | A1* | 3/2019 | Ju | G06K 9/00778 |
| 2019/0147600 | A1* | 5/2019 | Karasev | G06T 17/20 382/107 |
| 2019/0226853 | A1* | 7/2019 | Kubiak | G06T 3/0043 |

OTHER PUBLICATIONS

Florian Chabot et al. "Deep MANTA: A Coarse-to-Fine Many-Task Network for Joint 2D and 3D Vehicle Analysis From Monocular Image", arXiv:1703.07570, Mar. 22, 2017, 10 pages.

Xiaozhi Chen et al. "Monocular 3D Object Detection for Autonomous Driving", the IEEE Conference on Computer Vision and Pattern Recognition (CVPR), 2016, pp. 2147-2156.

* cited by examiner

OBJECT DETECTING APPARATUS, OBJECT DETECTING METHOD, AND COMPUTER PROGRAM PRODUCT

CROSS-REFERENCE TO RELATED APPLICATIONS

This application is based upon and claims the benefit of priority from Japanese Patent Application No. 2017-225091, filed on Nov. 22, 2017; the entire contents of which are incorporated herein by reference.

FIELD

Embodiments described herein relate generally to an object detecting apparatus, an object detecting method, and a computer program product.

BACKGROUND

Conventionally, a technology has been available for detecting an object from a captured image captured with a monocular camera. Also, a technology has been known for estimating the position and the pose of an object detected from a captured image, by giving some assumptions as constraints. Such conventional technologies are, however, incapable of estimating the pose of the object correctly when the assumptions do not apply. For example, in an application for detecting an obstacle near a vehicle as an object, and controlling to cause the vehicle to avoid the obstacle, a lack of such capability might result in a reduced reliability in the vehicle control. Therefore, there has been a demand for an improved accuracy in the estimation of the pose of an object.

DETAILED DESCRIPTION

According to an embodiment, an object detecting apparatus includes a detector and an estimation processing unit. The detector is configured to detect an object candidate area from a captured image. The estimating processing unit is configured to, by performing estimation processing using a part of or a whole of the captured image including at least the object candidate area, output object information including at least information representing a pose of an object in the object candidate area. The estimation processing includes: a first process estimating, from among vertices of a cuboid circumscribing the object and making contact with a road surface, positions of at least two vertices on the captured image that are viewable from a viewpoint of the captured image; and a second process estimating to which one of right-front, left-front, right-rear, or left-rear of the object the vertices having positions estimated by the first process are respectively corresponding.

An object detecting apparatus, an object detecting method, and a computer program product according to one embodiment will now be explained in detail with reference to the accompanying drawings. The object detecting apparatus according to the embodiment detects an object that is included in a captured area on the basis of a captured image captured with a monocular camera, and outputs object information at least including information on the pose of the detected object. Used in the explanation hereunder is an example in which the object detecting apparatus provided onboard a vehicle. In such a configuration, examples of an object to be detected by the object detecting apparatus include obstacles, such as other vehicles (hereinafter, referred to as "another vehicle"), pedestrians, and two-wheeled vehicles including bicycles and motorcycles that are located near a vehicle on which the onboard object detecting apparatus is mounted (hereinafter, referred to as an "own-vehicle", and objects installed on roadside such as traffic lights, traffic signs, telephone poles, and signboards that might obstruct driving of the own-vehicle. The object detecting apparatus acquires a captured image captured with a monocular camera mounted on the own-vehicle (hereinafter, referred to as an "onboard camera"), detects an obstacle included in an area captured by the onboard camera, and outputs the object information.

Figure 1:
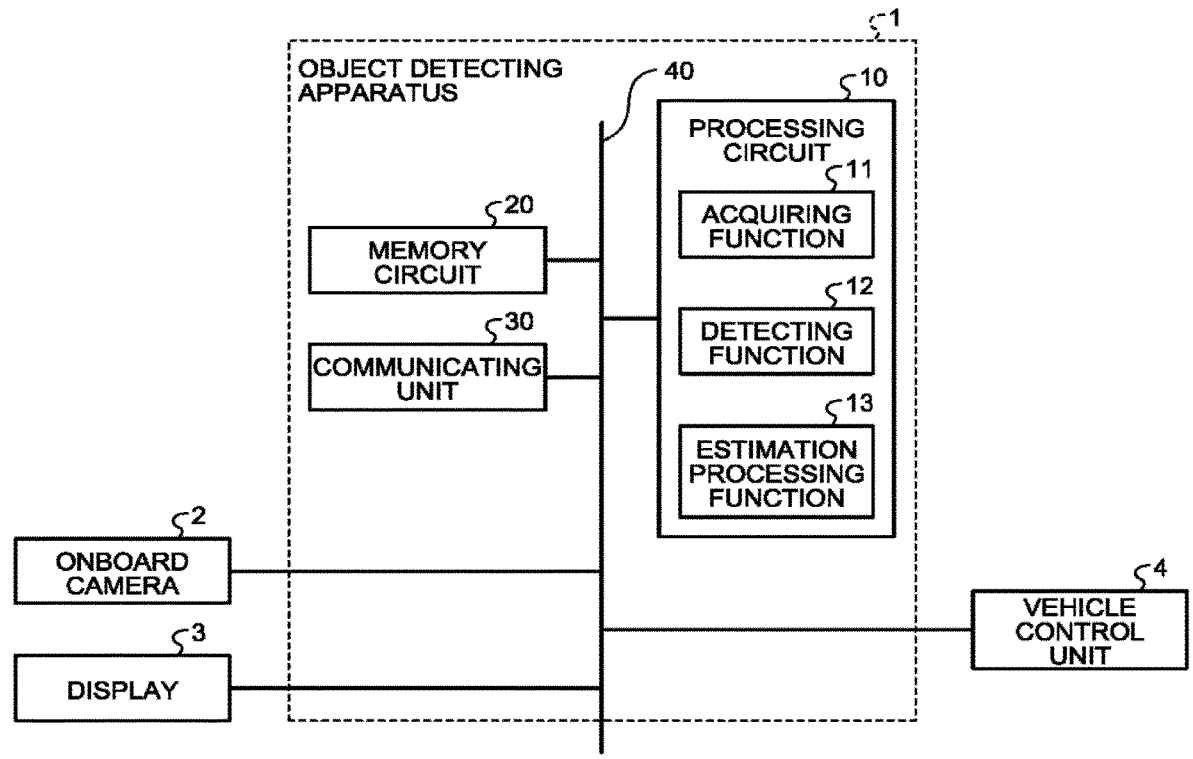
FIG. 1 is block diagram illustrating an exemplary configuration of an object detecting apparatus according to one embodiment.

FIG. 1 is a block diagram illustrating an exemplary configuration of such an object detecting apparatus 1 according to the embodiment. This object detecting apparatus 1 is configured as a dedicated or general-purpose computer, for example, and includes a processing circuit 10, a memory circuit 20, a communicating unit 30, and a connect bus 40 connecting these units, as illustrated in FIG. 1. An onboard camera 2, a display 3, and a vehicle control unit 4 are connected to the object detecting apparatus 1 in a wired or wireless manner.

The processing circuit 10 includes an acquiring function 11, a detecting function 12, and an estimation processing function 13. Specifics of these processing functions will be described later. Illustrated in FIG. 1 are main processing functions relevant to the embodiment, but the processing functions included in the processing circuit 10 are not limited thereto.

The processing functions executed by the object detecting apparatus 1 are stored in the memory circuit 20 in the form of a computer-executable program, for example. The processing circuit 10 is a processor for implementing a processing function corresponding to a computer program, by reading the computer program from the memory circuit 20 and executing the computer program. The processing circuit 10 having read the computer programs obtains the functions illustrated in FIG. 1.

Illustrated in FIG. 1 is an example in which the processing functions including the acquiring function 11, the detecting function 12, and the estimation processing function 13 are implemented by one processing circuit 10, but the processing circuit 10 may be provided as a combination of a plurality of independent processors. In such a configuration, each of the processing functions may be configured as a computer program, or some specific function may be implemented as an independent dedicated circuit executing a computer program.

The "processor" mentioned above means a circuit examples of which include a general-purpose processor such as a central processing unit (CPU) and a graphical processing unit (GPU), an application specific integrated circuit (ASIC), and a programmable logic device (such as a simple programmable logic device (SPLD), a complex programmable logic device (CPLD), and a field programmable gate array (FPGA)). The processor implements a function by reading a computer program stored in the memory circuit 20 and executing the computer program. Instead of storing the computer program in the memory circuit 20, the computer program may also be incorporated into the processor circuit directly. In such a configuration, the processor implements the function by reading the computer program incorporated in the circuit, and executing the computer program.

The memory circuit 20 stores therein data accompanying the processing functions implemented by the processing circuit 10, as required. The memory circuit 20 according to the embodiment stores therein computer programs and data used in various processes. Examples of the memory circuit 20 include a random access memory (RAM, a semiconductor memory device such as a flash memory, a hard disk, and an optical disc. The memory circuit 20 may be substituted by a storage device external to the object detecting apparatus 1. The memory circuit 20 may also be a storage medium temporarily storing therein a computer program having been communicated and downloaded over a local area network (LAN) or the Internet. The number of the storage medium is not limited to one, and the storage medium may include a plurality of media.

The communicating unit 30 is an interface for inputting information to and outputting information from an external device that is connected in a wired or wireless manner. The communicating unit 30 may also perform the communication by establishing a connection to a network.

The onboard camera 2 is a small inexpensive monocular camera that is mounted on the front side of the own-vehicle, at a position near the center of the vehicle width, for example. The onboard camera 2 may be a camera capturing a monochromatic image, or a camera capturing a color image. The onboard camera 2 may be a visible-light camera or a camera capable of acquiring infrared information. The onboard camera may also be mounted in a manner enabled to capture an image of the rear side or a lateral side of the own-vehicle.

The display 3 is a display device such as a liquid crystal display, and displays various types of information. In the embodiment, the display 3 can display, for example, an image drawn with the object information output from the object detecting apparatus 1.

The vehicle control unit 4 controls the amount of acceleration, the amount of braking, and the steering angle in the own-vehicle. In the embodiment, the vehicle control unit 4 can control to avoid obstacles by estimating the behavior (relative movement) of the obstacles, positioned near the own-vehicle, with respect to the own-vehicle, using the object information output from the object detecting apparatus 1.

The processing functions included in the processing circuit 10 will now be explained. The acquiring function 11 acquires a captured image captured by the onboard camera 2. The acquiring function 11 acquires a captured image successively at an interval of N frames per second, for example, from the onboard camera 2, and outputs the acquired captured image to the detecting function 12 and the estimation processing function 13, as appropriate. In the embodiment, the acquiring function 11 is configured to acquire the captured image from the onboard camera 2, because this embodiment assumes an application in which the object detecting apparatus 1 is provided onboard a vehicle. However, the acquiring function 11 may be configured to acquire the captured image from the most appropriate monocular camera depending on the application. For example, for monitoring applications, the acquiring function 11 may acquire the captured image from a monocular camera installed as a fixed-position camera in a building or on a telephone pole. The acquiring function 11 may also be configured to acquire the captured images from a monocular camera mounted on a headgear device capturing an image of the front side, a lateral side, or rear side of the wearer.

The detecting function 12 detects an area that is likely to include the object to be detected (hereinafter, referred to as an "object candidate area") from a captured image captured by the onboard camera 2 and received from the acquiring function 11. The detecting function 12 generally detects a large number of object candidate areas from one frame of a captured image, but may also be configured to detect one object candidate area. The object to be detected may be any one of another vehicle, a pedestrian, a two-wheeled vehicle, and a roadside object, or a plurality of types of such objects may be detected simultaneously. A process performed by the detecting function 12 will be explained below, under the assumption that the object to be detected is another vehicle.

The detecting function 12 detects an object candidate area on the basis of a determination as to whether the object to be detected is present, using a scanning rectangle having a size corresponding to the size of the object, in the captured image captured by the onboard camera 2. Other vehicles (vehicles), which are an example of the object to be detected, are on a road, and the sizes of other vehicles do not deviate very much from the size of a standard vehicle, although the degree of the deviation varies depending on the vehicle type. Therefore, the size of the scanning rectangle can be established on the basis of the size of the standard vehicle and the parameters of the onboard camera 2, correspondingly to the position where the scanning rectangle is to be placed in the captured image.

Figure 2:
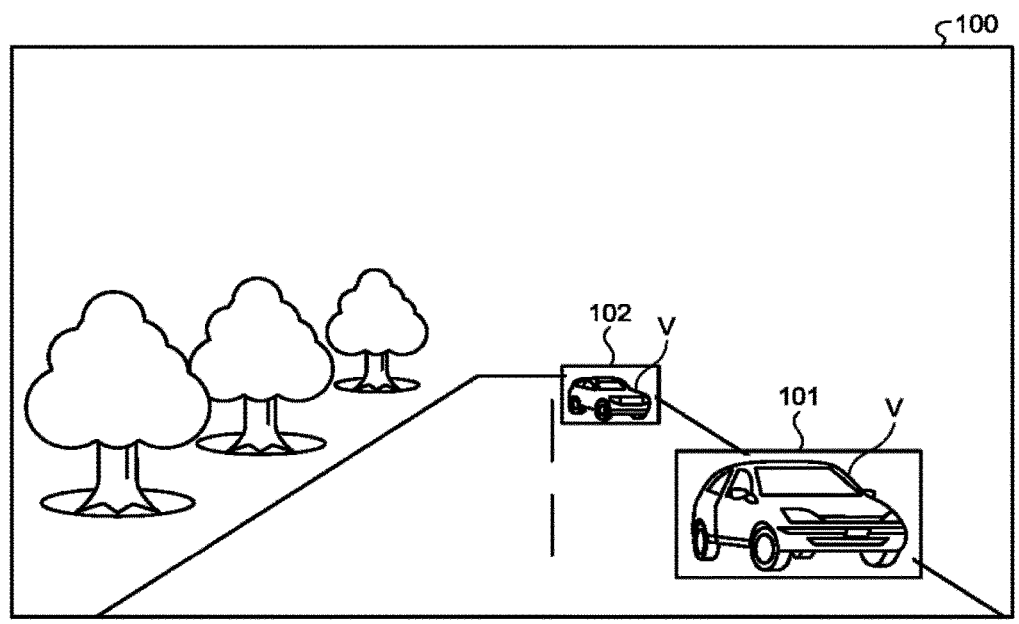
FIG. 2 is a schematic for explaining an exemplary process performed by a detecting function.

For example, as illustrated in FIG. 2, a scanning rectangle 101 that assumes the size of another vehicle V at a position near the onboard camera 2 is used at a position corresponding to a position near the onboard camera 2 in the captured image 100. R scanning rectangle 102 that assumes the size of another vehicle V at a position away from the onboard camera 2 is used at a position corresponding to a position away from the onboard camera 2 in the captured image 100. The detecting function 12 then calculates an image feature, such as histograms of oriented gradients (HOG) or co-occurrence histograms of oriented gradients (CoHOG) value, for the image area inside of the scanning rectangle 101, 102, and either determines whether there is any other vehicle V in the scanning rectangle 101, 102 using a classifier having been trained in advance, or outputs likelihood indicating the likeliness of the image being another vehicle V. Examples of the image feature are not limited to those listed herein, and any feature value calculated from an image may be used.

The detecting function 12 may also be configured to calculate an image feature for the scanning rectangle, and to output likelihood of the image being another vehicle, using a neural network having been trained in advance, for example. Furthermore, the detecting function 12 may also be configured to input the image inside of the scanning rectangle directly to a neural network having been trained in advance, and to cause the neural network to output likelihood of the object being another vehicle. The detecting function 12 may also be configured to input a part of or a whole of the captured image captured by the onboard camera 2 to a neural network having been trained in advance, to obtain only the output of the position of the scanning rectangle, and to further subject the position to processing using a neural network or the like, and to cause the neural network to output likelihood of the object being another vehicle. As the neural network configured in such a manner, a known deep neural network such as a Single Shot Multibox Detector (SSD) (Wei Liu et. al. ECCV 2016) or You Look Only Once (YOLO) (arXiv:1612.08242) may be used.

To detect a plurality of types of objects such as other vehicles and pedestrians, the number of variations in the shape or the size of the scanning rectangle may be increased, correspondingly to the respective types of objects. Furthermore, even when the objects to be detected are only other vehicles, for example, the number of variations in the shape or the size of the scanning rectangle may be increased, examples of such variations including a scanning rectangle having a shape for detecting vertically oriented another vehicle, and one having a shape for detecting horizontally oriented another vehicle.

The detecting function 12 detects an area of the captured image in which the likelihood for the scanning rectangle is equal to or greater than a preset threshold as an object candidate area, for example, and outputs candidate area information including information indicating the position of the object candidate area in the captured image and the likelihood, to the estimation processing function 13. Alternatively, the detecting function 12 may sort the areas of the captured image from those with the highest likelihood for the scanning rectangle, detect predetermined top N areas as object candidate areas, and output the candidate area information thereof. Furthermore, for the areas of the captured image exhibiting high likelihood for the scanning rectangle, the detecting function 12 may put the areas exhibiting a certain overlap into one group, and establish the top N areas exhibiting the highest likelihood, or the areas exhibiting likelihood equal to or greater than a certain threshold, as the object candidate areas, and output candidate area information for such areas. This approach can be implemented using a technique referred to as non-maximum suppression (NHS). When the detecting function 12 groups the areas of the captured image, the detecting function 12 may group only the areas that can be considered to be substantially at the same distance from the onboard camera 2.

The estimation processing function 13 performs estimating processing using an image at least including the object candidate area detected by the detecting function 12 (a part of or a whole of the captured image), and outputs object information at least including the information representing the pose of the object in the object candidate area. The estimating processing performed by the estimation processing function 23 includes a first process estimating, among vertices of a cuboid circumscribing the object included in the object candidate area and making contact with a road surface, at least positions of two vertices on the captured image that are viewable from a viewpoint of the captured image, and a second process estimating that the at least positions of two vertices are right-front, left-front, right-rear, or left-rear of the object. The estimating processing performed by the estimation processing function 13 will be generally explained below, under the assumption that the object to be detected is another vehicle, which is the same example as that used in the description of the detecting function 12.

Figure 3A:
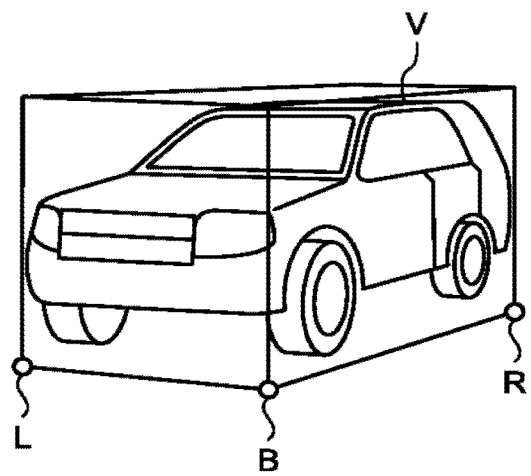
FIGS. 3A to 3C are schematics for explaining examples of anchor points of an object.
Figure 3B:
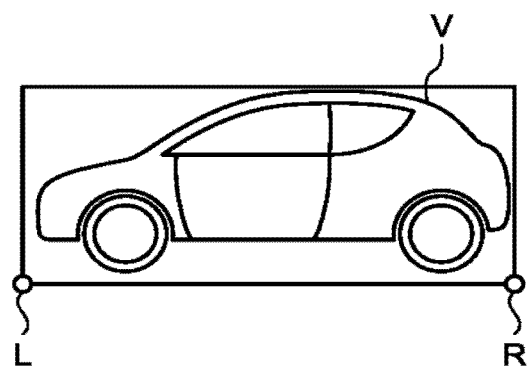
Figure 3C:
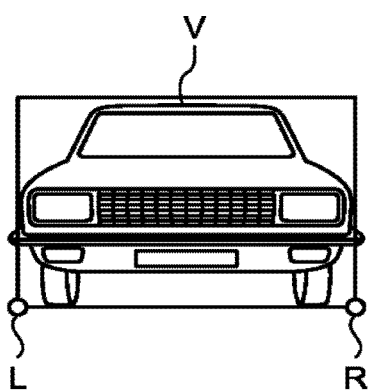

As illustrated in FIGS. 3A, 3B, and 3C, the first process estimates, among the vertices of a cuboid circumscribing the object (another vehicle V) included in the object candidate area and making contact with a road surface, the positions of two or more vertices that are viewable from a viewpoint of the captured image (the viewpoint of the onboard camera 2) in the captured image. Hereinafter, these vertices are referred to as anchor points. In particular, from among the anchor points corresponding to one object and making contact with a road surface, the anchor point viewed at left-most in the captured image is referred to as a "left anchor point", the anchor point viewed at right-most in the captured image is referred to as "right anchor point", and an anchor point viewed between the left anchor point and the right anchor point is referred to as a "bottom anchor point". The position (the horizontal and the vertical coordinates) of each of these anchor points in the captured image is referred to as an "anchor point position". FIG. 3A illustrates an example in which the anchor point positions of the left anchor point L, the bottom anchor point B, and the right anchor point R are estimated. FIGS. 3B and 3C illustrate examples in which there is no bottom anchor point B, and the anchor point positions of the left anchor point L and the right anchor point R are estimated.

Figure 4A:
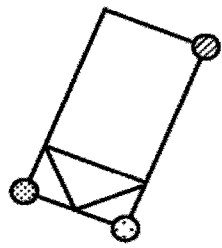
FIGS. 4A to 4H are schematic for explaining examples of an orientation type of the object.
Figure 4B:
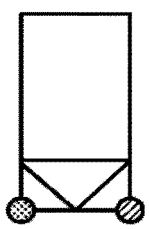
Figure 4C:
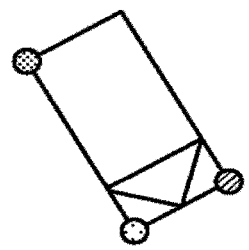
Figure 4D:
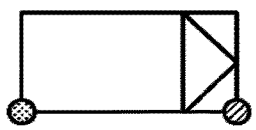
Figure 4E:
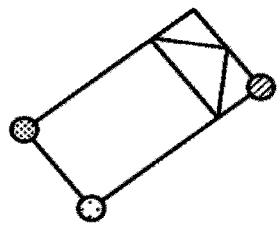
Figure 4F:
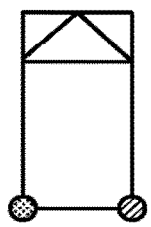
Figure 4G:
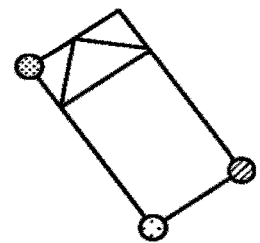
Figure 4H:
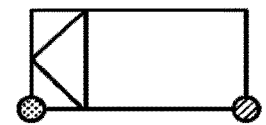

The second process estimates at which of right-front, left-front, right-rear, and left-rear of the object (another vehicle V) included in the object candidate area the anchor points resultant of the first process are. As described earlier, the first process estimates the anchor point positions of the left anchor point L, the bottom anchor point B, and the right anchor point R, or the anchor point positions of the left anchor point L and the right anchor point R. Therefore, the second process estimates that the combination of the anchor point ((the left anchor point L, the bottom anchor point B, and the right anchor point R) or (the left anchor point L and the right anchor point R)) for which the anchor point positions are estimated by the first process is corresponding to which one of the eight patterns illustrated respectively in FIGS. 4A to 4H. In other words, the second process estimates to which of (the right-front, the left-front, and the left-rear) of the object illustrated in FIG. 4A, (the right-front and the left-front) of the object illustrated in FIG. 4B, (the right-rear, the right-front, and the left-front) of the object illustrated in FIG. 4C, (the right-rear and the right-front) of the object illustrated in FIG. 4D, (the left-rear, the right-rear and the right-front) of the object illustrated in FIG. 4E, (the left-rear and the right-rear) of the object illustrated in FIG. 4F, (the left-front, the left-rear, and the right-rear) of the object illustrated in FIG. 4G, and (the left-front and the left-rear) of the object illustrated in FIG. 4H the combination of the anchor points (the left anchor point L, the bottom anchor point B, and the right anchor point R) or (the left anchor point L and the right anchor point R) corresponds. Hereinafter, the combination of the right-front, the left-front, the right-rear, and the left-rear of the object is referred to as an "orientation type". For the example illustrated in FIG. 3A, the second process estimates the orientation type illustrated in FIG. 4A. For the example illustrated in FIG. 3B, the second process estimates the orientation type illustrated in FIG. 4H. For the example illustrated in FIG. 3C, the second process estimates the orientation type illustrated in FIG. 4B.

The orientation types estimated by the second process are not limited to eight types illustrated in FIG. 4A to 4H. For example, if the detecting function 12 is configured not to detect an area including only the front side, the rear side, or only one lateral side of the object in the captured image, as an object candidate area, the first process will estimate the anchor point position of a bottom anchor point B. Therefore, the second process estimates to which of the four orientation types (the right-front, the left-front, and the left-rear), (the right-rear, the right-front, and the left-front), (the left-rear, the right-rear and the right-front), and (the left-front, the left-rear, and the right-rear) the combination (the left anchor point L, the bottom anchor point B, and the right anchor point R) for which the anchor point positions are estimated by the first process corresponds. Furthermore, because the view of the object changes depending on the position of the onboard camera 2, the number and selection of the types included in the combinations may be changed accordingly, depending on the circumstances.

At least one of the first process and the second process described above may be performed using a neural network trained in advance. For example, it is possible to use any one or both of a neural network trained to estimate the anchor point positions and a neural network trained to estimate the orientation type, or it is possible to use a neural network trained to estimate the anchor point positions and the orientation type simultaneously. The approach for implementing the estimation processing function 13 is not limited to a neural network, and may be implemented using any approach, as long as the process can estimate the anchor point positions and the orientation type. The estimation processing function 13 will now be explained further in detail, assuming that a neural network trained to estimate the anchor point positions and the orientation type simultaneously is used, for example.

To begin with, the input to the neural network used in the estimating processing will be explained. As an input, the whole of the captured image corresponding to one frame received from the acquiring function 11 at some point in time, or a part of the captured image may be input to the neural network. For example, for a captured image captured by the onboard camera 2 capturing the front side of the own-vehicle, the captured image with an upper area thereof trimmed may be input to the neural network, assuming that there are no other vehicles or pedestrians in the upper area. Furthermore, the estimation processing function 13 may identify the position of the object candidate area in the captured image on the basis of the candidate area information received from the detecting function 12, and input only the object candidate area clipped from the captured image to the neural network.

Figure 5:
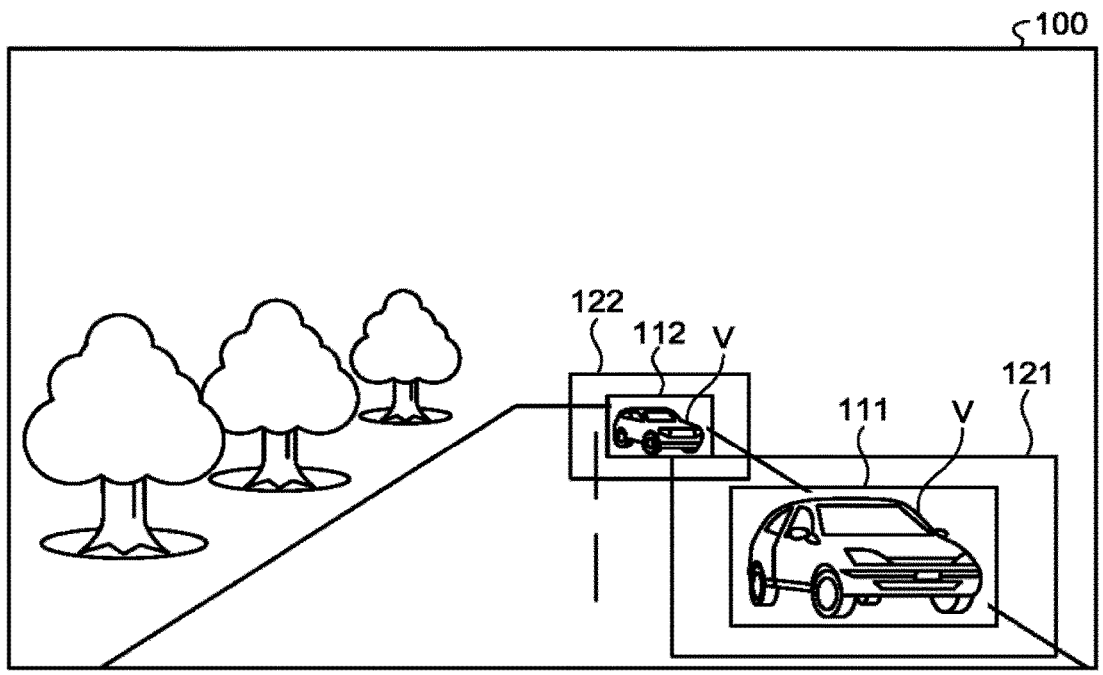
FIG. 5 is a schematic for explaining a variation of an input to a neural network.

The estimation processing function 13 may also clip areas 121, 122, illustrated in FIG. 5, that are K times larger than the respective object candidate areas 111, 112 in the captured image 100, for the object candidate areas 111, 112, and input the areas 121, 122 to the neural network. The areas 121, 122 may partly extend outside of the captured image 100. In such a case, the area outside of the captured image 100 may be filled with a pixel value corresponding to black, for example, or filled with pixel values at the corresponding end of the captured image 100. The ways in which the area outside of the captured image 100 is filled are not limited to those described herein, and may be filled in any other way.

The image data input the neural network may also be an R, G, B color image, or an image resultant of a color space conversion, such as a Y, U, V color image. Furthermore, the image input to the neural network may be a one-channel image resultant of converting the color image into a monochromatic image. Furthermore, instead of inputting the image as it is, assuming that an R, G, B color image is to be input, for example, the neural network may also receive an image from which an average pixel value in each channel is subtracted, or a normalized image from which an average value is subtracted and divided by a variance, as an input. Furthermore, a captured image corresponding to some point in time, or a part thereof may be also input to the neural network. It is also possible to input a captured image including a plurality of frames corresponding to several points in time with reference to one point in time, or a part of each captured image including a plurality of frames may be input to the neural network.

The estimating processing performed by the neural network will now be explained. The neural network applies estimating processing to the input image data to acquire feature map for estimating the anchor point positions and the orientation type corresponding to the object included in the object candidate area detected from the captured image by the detecting function 12. The anchor point positions and the orientation type of the object in the object candidate area are then estimated using the acquired feature map, and the results are then output.

Figure 6:
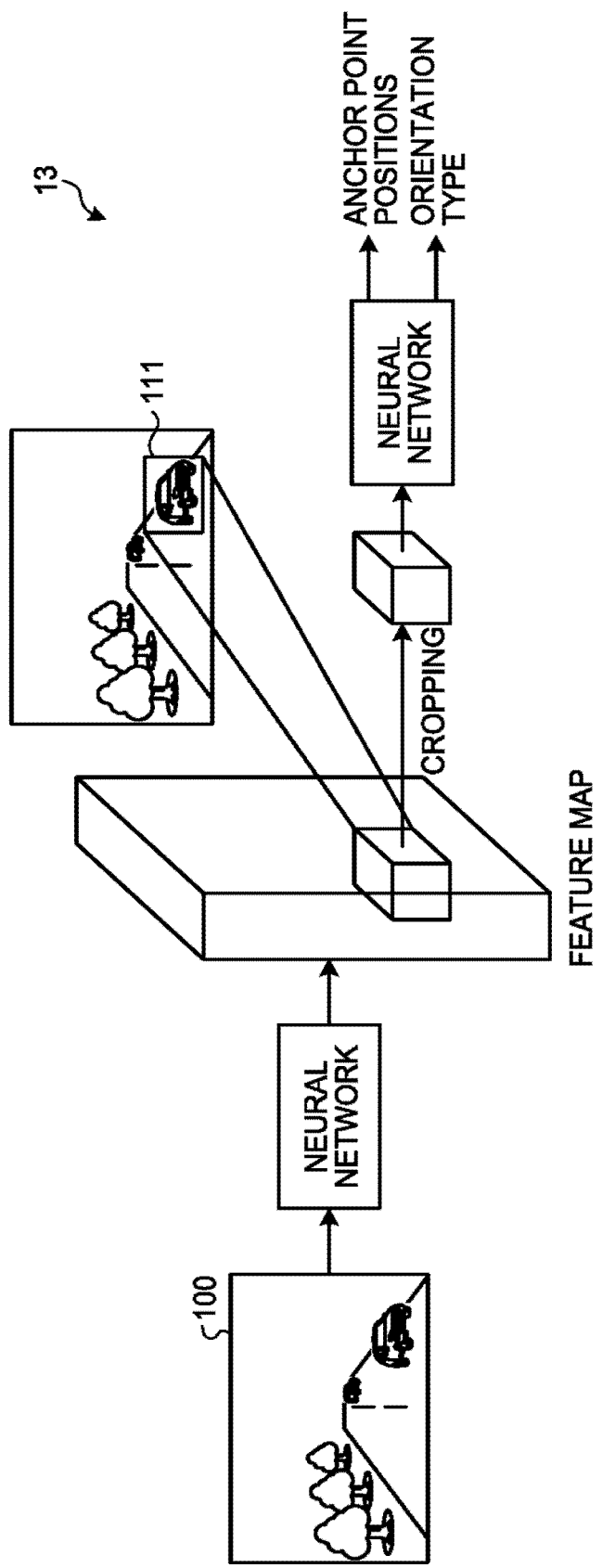
FIG. 6 is a schematic for explaining an exemplary process performed by a non-linear processing function.
Figure 7:
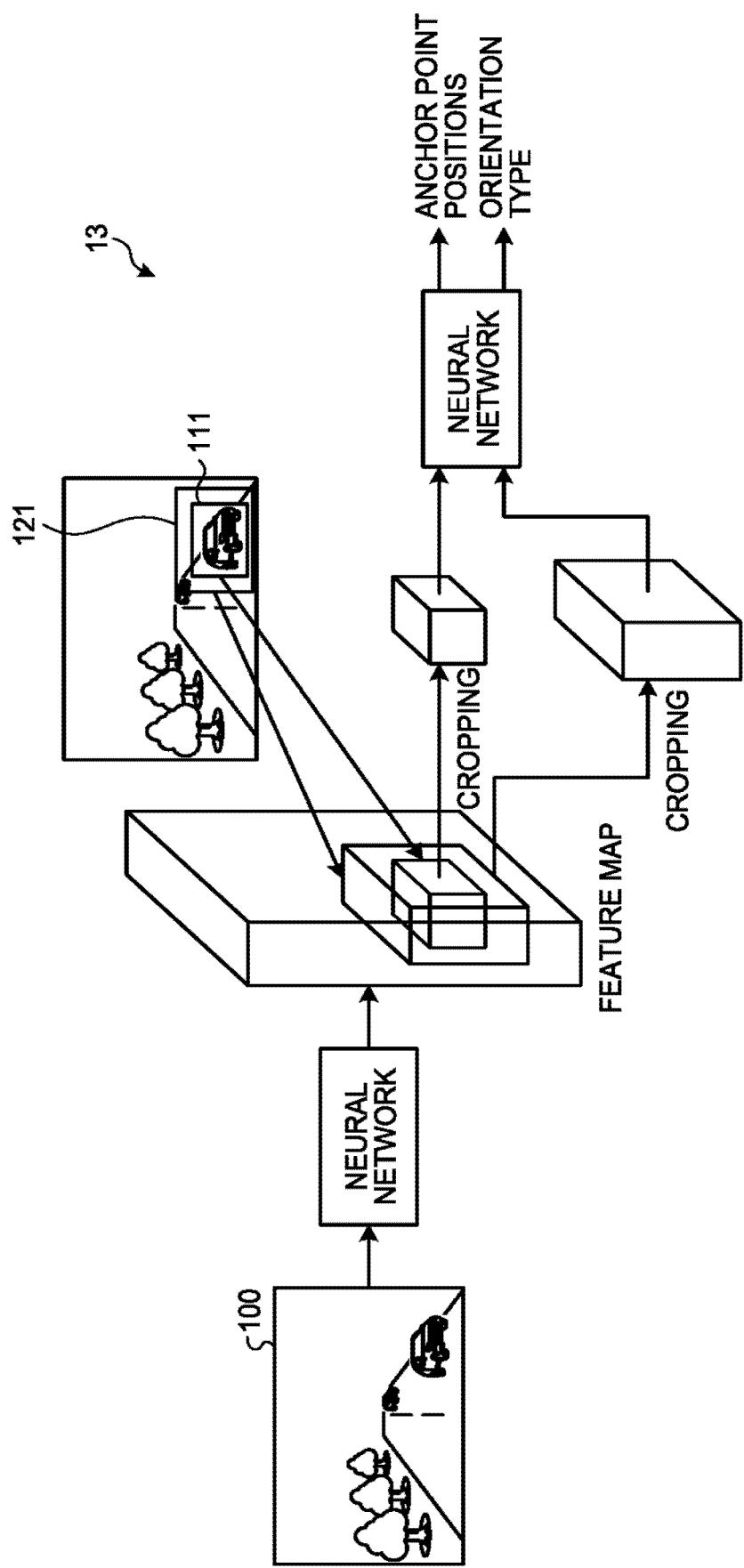
FIG. 7 is a schematic for explaining an exemplary process performed by the estimation processing function.

When the whole of the captured image captured by the onboard camera 2 or the image resultant of trimming unnecessary portions of the whole of the captured image is input to the neural network, in addition to the image of the object candidate area detected by the detecting function 12, the resultant feature map will be a feature map corresponding to such an image. In such a case, the estimation processing function 13 crops the feature map corresponding to the object candidate area 111 on the basis of the candidate area information received from the detecting function 12, as illustrated in FIG. 6, and uses the result in estimating the anchor point positions and the orientation type. The feature map can be cropped using a technique referred to as region-of-interest (ROI) pooling (Fast Region-based Convolutional Networks (R-CNN), Ross Girshick, ICCV2015), for example. At this time, the estimation processing function 13 may crop not only the feature map corresponding to the object candidate area 111, but also the feature map corresponding to the area 121 that is K times larger than the object candidate area 111, as illustrated in FIG. 7, and use any one or both of these feature maps for estimating the anchor point positions and the orientation type, for example.

Figure 8:
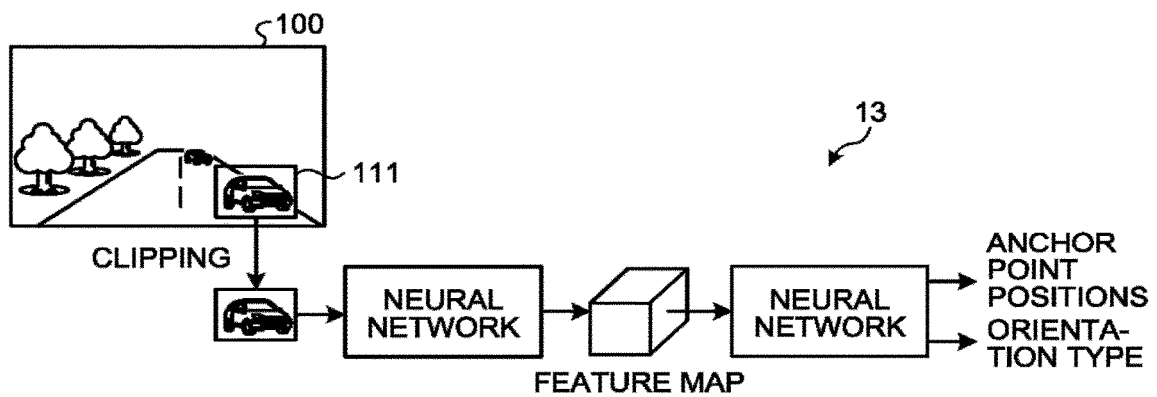
FIG. 8 is a schematic for explaining an exemplary process performed by the estimation processing function.
Figure 9:
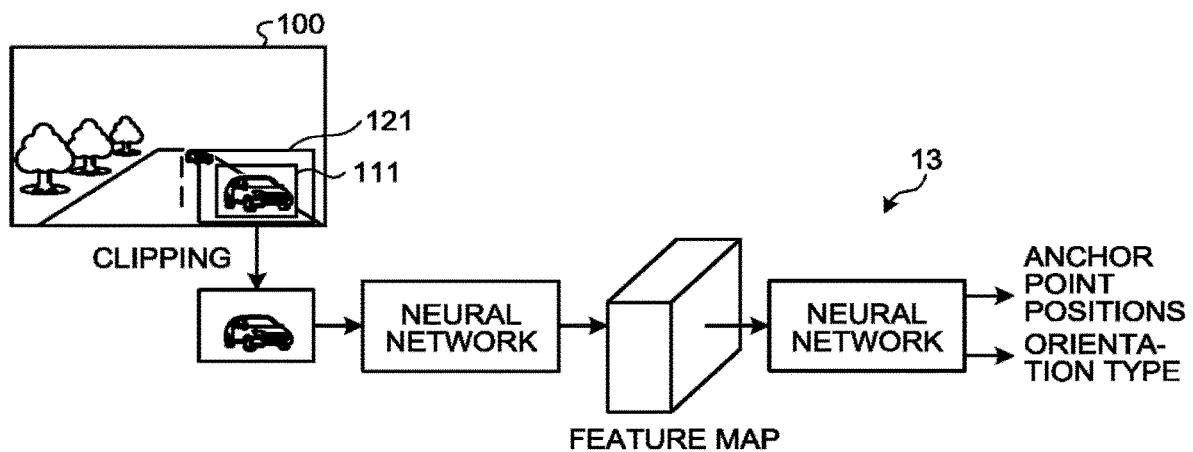
FIG. 9 is a schematic for explaining an exemplary process performed by the estimation processing function.
Figure 10:
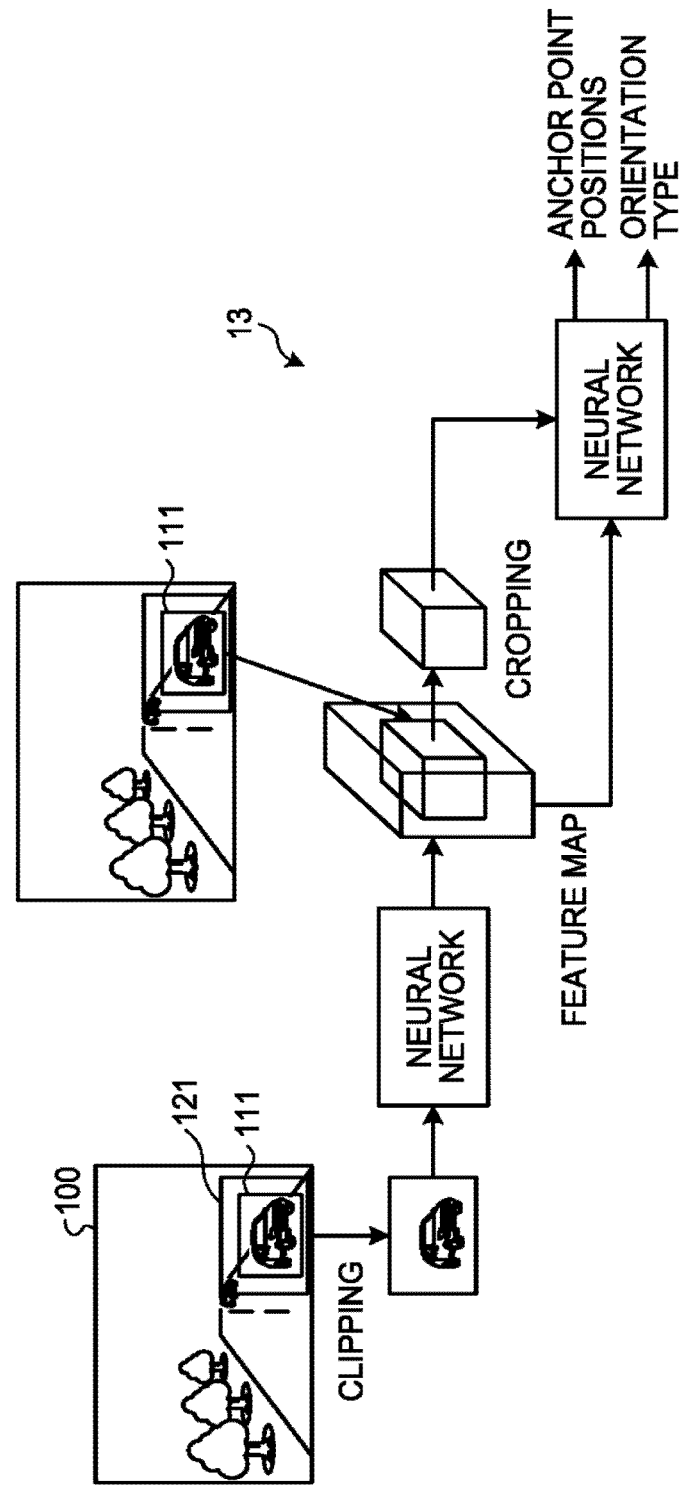
FIG. 10 is a schematic for explaining an exemplary process performed by the estimation processing function.

When the clipped image corresponding to the object candidate area 111 detected by the detecting function 12 and clipped from the captured image 100 captured by the onboard camera 2 is input to the neural network, as illustrated in FIG. 8, for example, a feature map corresponding to the object candidate area 111 is acquired. Therefore, in such a case, the acquired feature map can be used for estimating the anchor point positions and the orientation type as it is. When the clipped image of the area 121 that is K times larger than object candidate area 111 is input to the neural network, as illustrated in FIG. 9, for example, the feature map corresponding to the area 121 is acquired. In this case, the feature map corresponding to the area 121 may be used for estimating the anchor point positions and the orientation type as it is, or a feature map corresponding to the object candidate area 111 may be cropped from the feature map corresponding to the area 121, as illustrated in FIG. 10, for example, and any one or both of the feature maps corresponding to the area 121 and the object candidate area 111 may be used for estimating the anchor point positions and the orientation type.

The output of the neural network will now be explained. The outputs from the neural network are likelihoods for the anchor point positions (the horizontal and the vertical coordinates of the left anchor point, the right anchor point, and the bottom anchor point on the captured image) and for the orientation type corresponding to the object included in the object candidate area, for example. The neural network may output only the orientation type with the highest likelihood, together with the anchor point position. The neural network may also output the highest likelihood of the orientation type as the reliability of the estimation of the orientation type.

The neural network may also output a value for correcting the object candidate area detected by the detecting function 12 to a more accurate object candidate area surrounded by another rectangle precisely circumscribing the object included in the object candidate area, as an additional output. Furthermore, the neural network used by the estimation processing function 13 may output likelihood indicating the probability at which an object is included in the object candidate area. Furthermore, the neural network may output the vertical coordinates of the top end of the rectangle circumscribing the object in the captured image. In such a case, the rectangle precisely circumscribing the object in the captured image can be estimated by identifying the left-most horizontal coordinate, the top-most vertical coordinate, and the right-most horizontal coordinates, and the bottom-most vertical coordinate based on the horizontal and the vertical coordinates of the left anchor point L, the right anchor point R, and the bottom anchor point B, and the vertical coordinates of the top end in the captured image.

The neural network used by the estimation processing function 13 is trained in such a manner that a loss that is calculated from correct answer data and the output from the neural network is reduced, in a manner suitable for the variations of the input and the output explained above. The correct answer data is given to the neural network in advance, correspondingly to the input image and the object-candidate area. The correct answer data herein is a piece of data including a label of the object included in the object-candidate area, information representing the rectangle precisely circumscribing the object, information indicating the horizontal and the vertical coordinates of the left anchor point L, the right anchor point R, and the bottom anchor point B of the object, and information indicating the orientation type. The bottom anchor point B, which is not visible depending on the orientation, as illustrated in FIGS. 3B and 3C, may not be set as the correct answer. Even when an anchor point is hidden behind another object or located outside of the image area, the anchor point can still be set as a correct answer, as long as the data has been correctly taught. When the first process is performed using a neural network trained with correct answer data in which the horizontal and the vertical coordinates of an anchor point hidden behind another object or located outside of the image area are set as the correct answer, the first process can estimate the anchor point position for an anchor point that is hidden behind another object or located outside of the captured image area. Even when an anchor point is located outside of the object candidate area, the anchor point may be set as a correct answer, as long as the data has been taught correctly. When the first process is performed using a neural network trained with correct answer data in which the horizontal and the vertical coordinates of an anchor point located outside of the object candidate area, the first process can estimate the anchor point position for an anchor point that is located outside of the object candidate area.

Figure 11:
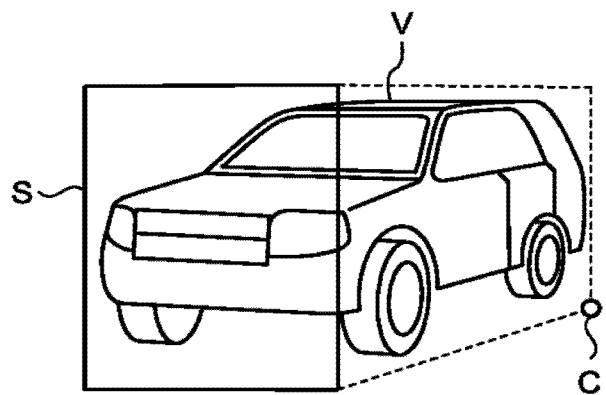
FIG. 11 is a schematic for explaining an example of an anchor point of the object.

As to the information indicating the horizontal and the vertical coordinates of the left anchor point, the right anchor point, and the bottom anchor point, when a cuboid circumscribing the object cannot be identified correctly in the image, a rectangle S correctly circumscribing the front side or the rear side of the object, as illustrated in FIG. 11, and a viewable vertex C belonging to a cuboid circumscribing the object and positioned on the side opposite to the front side or the rear side may be taught in advance. The horizontal and the vertical coordinates of the two ends of the bottom side of the rectangle, and those of the vertex C may then be used as correct answer data for the horizontal and the vertical coordinates of the left anchor point L, the bottom anchor point B, and the right anchor point R, respectively, sequentially from the left side of the image. By allowing the first process to be performed using a neural network trained with such correct answer data, it is possible to estimate the anchor point positions of the left anchor point L, the bottom anchor point B, and the right anchor point R even when the cuboid circumscribing the object in the object candidate area cannot be identified correctly in the captured image.

As the label of the object, with a neural network configured to detect only other vehicles, and intended to estimate the anchor point positions and orientation type corresponding to another vehicle, for example, "1" may be assigned as a label when the rectangle circumscribing the other vehicle, exhibiting the highest overlap ratio with the object candidate area, exhibits an overlap ratio equal to or greater than a certain threshold with respect to the rectangle indicating the object candidate area, and "0" may be assigned when not.

As described above, by using a neural network trained in advance to estimate the anchor point positions and the orientation type, the estimation processing function 13 according to the embodiment can estimate the anchor point positions and the orientation type correctly regardless of the pose of the object. The loss in the label of the object or the orientation type can be defined as a cross entropy error, and the losses in the circumscribing rectangle and the anchor point positions can be defined with a square error or smooth L1 error, for example. The loss in the entire neural network can be calculated by calculating the sum of the losses in the object label, the circumscribing rectangle, the anchor point positions, and the orientation type, and the like. Therefore, the neural network can be trained in a manner to minimize each of the losses while sharing the weight of the neural network through error propagation, for example.

Furthermore, different neural networks may be trained in advance, for the process from receiving an input of an image to acquiring a feature map, and the process from estimating the anchor point positions and the orientation type from the feature map and to outputting the result, or one neural network may be trained in advance for the entire process from receiving an input of the image to outputting the anchor point positions and the orientation type. Furthermore, in a configuration in which the detecting function 12 uses a neural network to detect the object candidate area, the neural network used by the detecting function 12 and the neural network used by the estimation processing function 13 may be trained in advance as one network.

When a plurality of types of objects (e.g., other vehicles and pedestrians) are to be detected simultaneously, different neural networks may be trained and used for the respective object types to be detected, or the same neural network may be trained and used. Even when the object to be detected is limited to other vehicles, different neural networks may be trained for respective vehicle types, such as passenger cars, trucks, and buses, and such neural networks may be used in the estimations of the anchor point positions or the orientation type, and the estimation processing function 13 may output the result with the highest likelihood as an output, for example.

When the neural network is configured to additionally output a value for correcting the object candidate area and a likelihood indicating the likeliness of being the object in the manner described above, and a large number of object candidate areas are detected from a captured image corresponding to one frame, the estimation processing function 13 may put the object candidate areas exhibiting a certain overlap into one group on the basis of the likelihood indicating the likeliness of being the object and the information on the corrected object candidate area, both of which are output from the neural network, and output only the estimation results for the top N object candidate areas with the highest likelihood, or the estimation results for the object candidate areas with likelihood equal to or greater than a certain threshold. This approach can be implemented using the technique referred to as NMS mentioned above, for example.

The information on the anchor point positions and the orientation type output from the neural network corresponds to information representing the pose of the object detected from the captured image. The estimation processing function 13 may output information on the anchor point positions and the orientation type as received from the neural network as the object information, or process the output from the neural network before outputting the result as the object information. For example, the estimation processing function 13 may output, based on the information of the anchor point positions and the orientation type, information indicating the coordinates for identifying a rectangle S circumscribing the front side or the rear side of another vehicle V (such as the coordinates of the upper left and the lower right vertices of the rectangle S), as illustrated in FIG. 11, the coordinates of the vertex C that is on the opposite side in the rectangle, and the information indicating whether the rectangle corresponds to the front side or the rear side of the other vehicle (e.g., 0 for the front side, and 1 for the rear side).

Furthermore, the estimation processing function 13 may also calculate three-dimensional position and the orientation of the object using the anchor point position and orientation type information output front the neural network, and output object information including the three-dimensional position and the orientation of the object. For example, when another vehicle is to be detected from a captured image captured by the onboard camera 2 mounted so as to capture an image of the travelling direction of the own-vehicle, the estimation processing function 13 may calculate at which position the other vehicle is located with respect to the own-vehicle using the anchor point position and orientation type information output from the neural network, and output the three-dimensional position of the other vehicle and the orientation of the other vehicle with respect to the own-vehicle, as the object information. When the estimation processing function 13 can acquire the coordinates (x1, y1) of the upper left vertex and the coordinates (x2, y2) of the lower right vertex of the circumscribing rectangle surrounding the other vehicle in the captured image, and the anchor point positions and the orientation type from the output from the neural network for the estimation processing function 13, for example, the estimation processing function 13 can obtain the three-dimensional position of the other vehicle and the orientation of the other vehicle in the top view using a known technique, by using these values, parameters of a road-surface plane separately acquired, and a parameter matrix of the onboard camera 2.

The vehicle control unit 4 connected to the object detecting apparatus 1 according to the embodiment can use the object information output from the estimation processing function 13, to perform the vehicle control of the own-vehicle, for example. The vehicle control unit 4 includes a collision avoidance system, an automatic braking system, an adaptive cruise control system, and an automatic operation control system, for example. Using the object information output in units of one frame of a captured image captured by the onboard camera 2, for example, the collision avoidance system can estimate a trajectory representing the movement of the other vehicle with respect to the own-vehicle, and calculate the probability of the own-vehicle colliding with the other vehicle in m seconds. The vehicle control unit 4 can then use the result to determine whether to activate the automatic braking system. Furthermore, using the object information output in units of one frame of a captured image captured by the onboard camera 2, the adaptive cruise control system can control to keep the own-vehicle inside the lane in which the own-vehicle is running while avoiding obstacles, and to ensure a clearance equal to or more than a predetermined distance with respect to the other vehicle running ahead of the own-vehicle. Using the object information output in units of one frame of a captured image captured by the onboard camera 2, the automatic operation control system can calculate a travel path for avoiding obstacles, and control the own-vehicle to travel the travel path autonomously.

Figure 12:
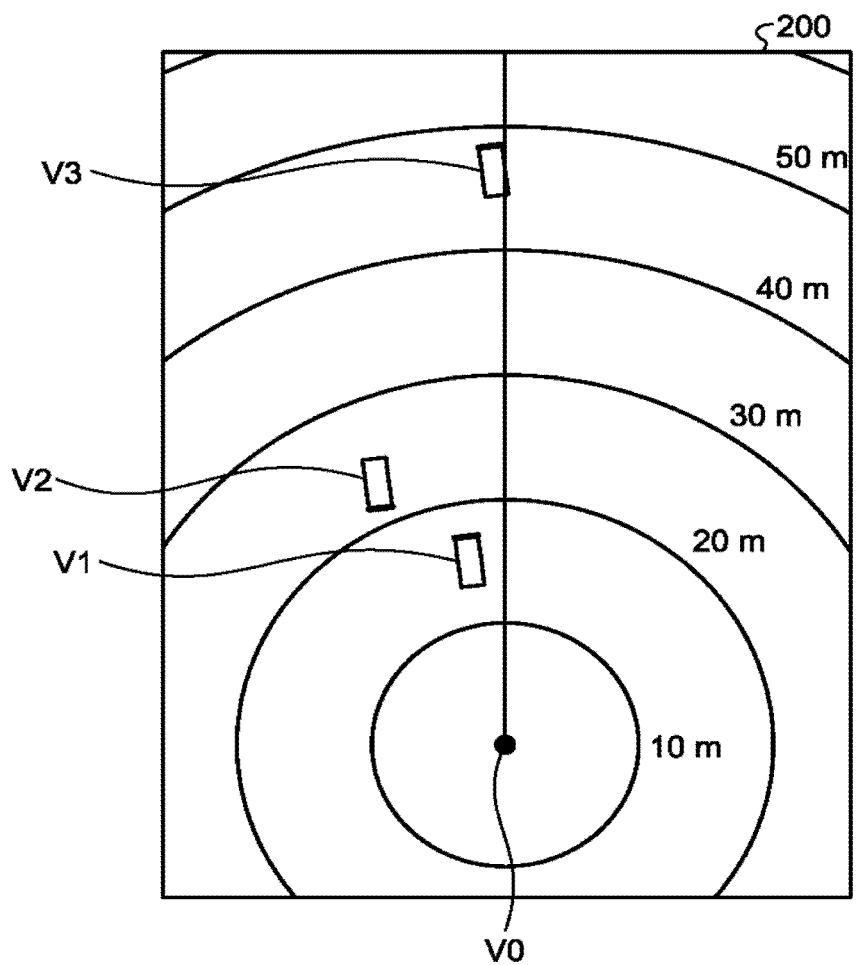
FIG. 12 is a schematic illustrating an example of an image to be displayed on a display.

Furthermore, for example, the object information output from the estimation processing function 13 may be used to display obstacle information onto the display 3 that is connected to the object detecting apparatus 1 according to the embodiment. For example, as illustrated in FIG. 12, an image 200 indicating the positions and the poses of the other vehicles V1, V2, V3 with respect to the own-vehicle V0 can be drawn and displayed on the display 3 on the basis of the object information output from the estimation processing function 13. In the example of an image illustrated in FIG. 12, using the position of the own-vehicle V0 as a reference, the distances to the other vehicles V1, V2, V3 are indicated by the positions where the rectangles representing the respective other vehicles V1, V2, V3 are drawn, and the pose of the other vehicles V1, V2, V3 are indicated by the angles at which the rectangles are drawn. The side of the rectangles drawn with a thick line indicates the front side of the other vehicles V1, V2, V3 (travelling direction).

Figure 13:
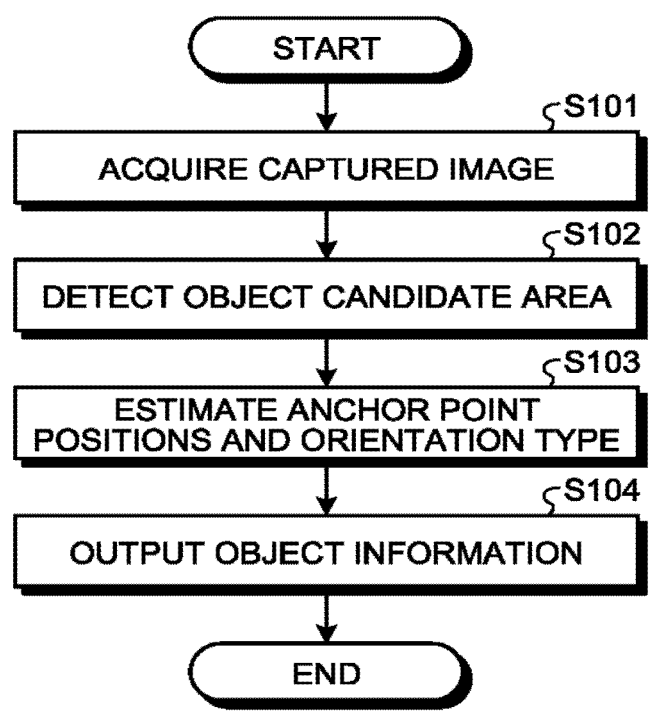
FIG. 13 is a flowchart illustrating an exemplary operation of the object detecting apparatus according to the embodiment.

FIG. 13 is a flowchart illustrating an exemplary operation of the object detecting apparatus 1 (the processing circuit 10) according to the embodiment explained above. Because the specific details of each step included in FIG. 13 has been described above, detailed explanation thereof will be omitted as appropriate.

To begin with, the acquiring function 11 of the processing circuit 10 acquires a captured image captured by the onboard camera 2 (monocular camera) (step S101). The detecting function 12 in the processing circuit 10 then detects at least one object candidate area from the captured image acquired at Step S101 (Step S102). The estimation processing function 13 of the processing circuit 10 then estimates the anchor point positions and the orientation type corresponding to the object included in the object candidate area on the basis of the captured image acquired at Step S101 and the candidate area information indicating the object candidate area detected at Step S102 (Step S103). At this time, the estimation processing function 13 estimates the anchor point positions and the orientation type corresponding to the object in the object candidate area using a neural network having been trained in advance. The estimation processing function 13 then outputs the object information at least including the information representing the pose of the object (Step S104).

As explained above, the object detecting apparatus 1 according to the embodiment detects an object candidate area from a captured image captured by the onboard camera 2 (monocular camera), and estimates the anchor point positions and the orientation type corresponding to the object included in the object candidate area, using a neural network having been trained in advance, for example. Therefore, with the object detecting apparatus 1 according to the embodiment, the pose of the object can be estimated highly accurately using an image captured by the onboard camera 2 (monocular camera).

When the object to be detected is another vehicle, for example, the object detecting apparatus 1 according to the embodiment can estimate the position of the other vehicle positioned in front of the own-vehicle in the driving lane with respect to the own-vehicle, and the orientation of the other vehicle accurately, using the result of estimating the anchor point positions and the orientation type of the other object captured in the captured image captured by the onboard camera 2, and use the position or the orientation in collision avoidance, automatic braking, and travel-path generation, for example.

The processing functions of the object detecting apparatus 1 according to the embodiment can be implemented by causing the object detecting apparatus 1 that is configured as a computer, as mentioned above, to execute a computer program, for example. In such a case, the computer program executed by the object detecting apparatus 1 according to the embodiment may be stored in a computer connected to a network such as the Internet, and made available for downloading over the network. Furthermore, the computer program executed by the object detecting apparatus 1 according to the embodiment may also be provided or distributed over a network such as the Internet. Furthermore, the computer program executed by the object detecting apparatus 1 according to the embodiment may be provided in a manner incorporated in a nonvolatile recording medium such as a read-only memory (ROM).

While certain embodiment has been described, the embodiment has been presented by wav of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An object detecting apparatus, comprising:
    a detector configured to detect an object candidate area from a captured image; and
    an estimation processing unit configured to, by performing estimation processing using a part of or a whole of the captured image including at least the object candidate area, output object information including at least information representing a pose of an object in the object candidate area, wherein
    the estimation processing includes:
        a first process estimating, from among vertices of a cuboid circumscribing the object, and the vertices of the cuboid indicating positions at which the object makes contact with a road surface, positions of at least two vertices on the captured image that are viewable from a viewpoint of the captured image, to estimate anchor point positions of the object; and
        a second process estimating based on positions of the vertices of the cuboid to which one of right-front, left-front, right-rear, or left-rear of the object the vertices having positions estimated by the first process are respectively corresponding, to estimate an orientation of the object, wherein
    for performing the estimation processing, at least one of the first process and the second process uses at least one of a first neural network trained to estimate the anchor point positions of the object and a second neural network trained to estimate the orientation of the object.

2. The apparatus according to claim 1, wherein
the first process estimates, from among the vertices of the cuboid circumscribing the object and making contact with the road surface, positions of vertices that are viewed at left-most and right-most on the captured image.

3. The apparatus according to claim 2, wherein
the first process further estimates a position of a vertex on the captured image that is viewed between the vertices that are viewed at left-most and right-most.

4. The apparatus according to claim 2, wherein
the second process estimates at which one of combinations (right-front, left-front, and left-rear), (right-front and left-front), (right-rear, right-front, and left-front), (right-rear and right-front), (left-rear, right-rear, and right-front), (left-rear and right-rear), (left-front, left-rear, and right-rear), and (left-front and left-rear) of the object is a combination of the vertices having positions estimated by the first process, sequentially from the vertex positioned at left.

5. The apparatus according to claim 4, wherein
the second process outputs a likelihood corresponding to each of the combinations, and further outputs highest one of the likelihoods as reliability.

6. The apparatus according to claim 1, wherein
the first process further estimates, from among the vertices of the cuboid circumscribing the object and making contact with the road surface, a position of a vertex located outside of an area of the captured image.

7. The apparatus according to claim 1, wherein
the first process further estimates, from among the vertices of the cuboid circumscribing the object and making contact with the road surface, a position of a vertex hidden behind another object that is different from the object.

8. The apparatus according to claim 1, wherein
the detector is configured to detect the object candidate area from the captured image, using a co-occurrence histograms of oriented gradients (CoHOG) feature.

9. The apparatus according to claim 1, wherein
the detector is configured to detect the object candidate area using a neural network receiving an input of the captured image and outputting the object candidate area.

10. The apparatus according to claim 1, wherein
the captured image is an image captured by an onboard camera, and
the object is at least one of a vehicle, a pedestrian, a two-wheeled vehicle, and a roadside object.

11. The apparatus according to claim 10, wherein
the onboard camera is a monocular camera.

12. The apparatus according to claim 10, further comprising a vehicle control unit configured to control a vehicle on which the onboard camera is mounted, based on the object information.

13. An object detecting method comprising:
detecting an object candidate from a captured image; and
outputting, by performing estimation processing using a part of or a whole of the captured image including at least the object candidate area, object information including at least information representing a pose of an object in the object candidate area, wherein
the estimation processing includes:
    a first process estimating, from among vertices of a cuboid circumscribing the object, and the vertices of the cuboid indicating positions at which the object makes contact with a road surface, positions of at least two vertices on the captured image that are viewable from a viewpoint of the captured image, to estimate anchor point positions of the object; and
    a second process estimating based on positions of the vertices of the cuboid to which one of right-front, left-front, right-rear, or left-rear of the object the vertices having positions estimated by the first process are respectively corresponding, to estimate an orientation of the object, wherein
for performing the estimation processing, at least one of the first process and the second process uses at least one of a first neural network trained to estimate the anchor point positions of the object and a second neural network trained to estimate the orientation type of the object.

14. A computer program product having a non-transitory computer readable medium including programmed instructions, wherein the instructions, when executed by a computer, cause the computer to perform:
a function of detecting an object candidate area from a captured image; and
a function of outputting, by performing estimation processing using a part of or a whole of the captured image including at least the object candidate area, object information including at least information representing a pose of an object in the object candidate area, wherein
the estimation processing includes:
    a first process estimating, from among vertices of a cuboid circumscribing the object, and the vertices of the cuboid indicating positions at which the object makes contact with a road surface, positions of at least two vertices on the captured image that are viewable from a viewpoint of the captured image, to estimate anchor point positions of the object; and
    a second process estimating based on positions of the vertices of the cuboid to which one of right-front, left-front, right-rear, or left-rear of the object the vertices having positions estimated by the first process are respectively corresponding to estimate an orientation of the object, wherein
for performing the estimation processing, at least one of the first process and the second process uses at least one of a first neural network trained to estimate the anchor point positions of the object and a second neural network trained to estimate the orientation of the object.

* * * * *